US007072736B2

(12) United States Patent
Platteter et al.

(10) Patent No.: US 7,072,736 B2
(45) Date of Patent: Jul. 4, 2006

(54) METHOD TO DETERMINE WHEN A MEDIA HANDLING SYSTEM CONFIGURATION IS VALID AND A MEDIA HANDLING SYSTEM ARRANGED IN ACCORDANCE WITH THE SAME METHOD

(75) Inventors: Dale T. Platteter, Fairport, NY (US); Robert S. Westfall, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 531 days.

(21) Appl. No.: 10/635,771

(22) Filed: Aug. 6, 2003

(65) Prior Publication Data

US 2005/0033560 A1 Feb. 10, 2005

(51) Int. Cl.
*G06F 7/00* (2006.01)

(52) U.S. Cl. ........................ 700/213; 700/91; 700/100; 270/58.01

(58) Field of Classification Search ................ 700/213, 700/219, 220, 222, 223, 91, 100, 108, 115; 270/58.01, 58.07, 58.08
See application file for complete search history.

(56) References Cited

U.S. PATENT DOCUMENTS

| | | | | |
|---|---|---|---|---|
| 5,383,116 | A * | 1/1995 | Lennartsson | 700/9 |
| 5,495,421 | A * | 2/1996 | Hidding | 700/213 |
| 5,592,881 | A * | 1/1997 | Rabjohns | 101/483 |
| 5,798,930 | A * | 8/1998 | van Oosten | 700/213 |
| 5,984,507 | A * | 11/1999 | Edens | 700/220 |
| 2003/0168796 | A1 * | 9/2003 | Suzuki et al. | 270/58.07 |

* cited by examiner

*Primary Examiner*—Khoi H. Tran
(74) *Attorney, Agent, or Firm*—Wayne J. Egan

(57) ABSTRACT

A media handling system comprises a configuration of N linked modules. Each module has an order based on the module's linkage in the configuration. Thus, a first module of order 1 links to a second module of order 2, the second module links to a third module of order 3, etc., and an (N−1)th module of order (N−1) links to an Nth module of order N. A feeder module feeds a sheet of media to downstream modules. Each downstream module sends a reporting message to an included controller. The reporting message includes the time the module processed the sheet and the module's reported type. For each reporting module, the controller determines the module's order and type based on the reported time and reported type in the module's reporting message. The controller validates the configuration by determining when the order and the type for the reporting modules match a predetermined pattern.

14 Claims, 3 Drawing Sheets

METHOD TO DETERMINE WHEN A MEDIA HANDLING SYSTEM CONFIGURATION IS VALID AND A MEDIA HANDLING SYSTEM ARRANGED IN ACCORDANCE WITH THE SAME METHOD

FIELD OF THE INVENTION

This application relates generally to media handling systems and in particular to a method to determine when a multiple-module media handling system configuration is valid.

BACKGROUND OF THE INVENTION

In multiple-module printing systems there are multiple modules which are configured to form a printing system. The customer can add or remove modules to provide the capabilities they need to print a particular job. Once the system is set up, the job scheduler needs to know the configuration or ordering of the modules in the system to determine the system's capabilities. If the configuration is not valid, paper jams will occur and the job will not print.

Thus there is a need to provide a method to validate the configuration.

SUMMARY OF THE INVENTION

In a first aspect of the invention, there is described a method to determine when a media handling system configuration is valid, the configuration comprising N modules linked so that a first module is linked to a second module, the second module is linked to a third module, and so forth, and an (N−1)th module is linked to an Nth module, the direction from the first module to the Nth module defined as downstream, each module characterized by a type and an order, each module's type having a corresponding type value that is a member of a predetermined group of type values, each module's order having a corresponding order value that is based on the module's linkage in the configuration so that the first module has an order value of 1, the second module has an order value of 2, the third module has an order value of 3, and so forth, the (N−1)th module has an order value of (N−1) and the Nth module has an order value of N, at least one module having a type value of feeder, thus forming a feeder module, the media handling system including a controller and a communication means, the method comprising:

a) by a feeder module, feed a sheet of media;

b) by each module downstream of the feeder module:
  - b1) process the sheet, thus forming a sheet processing;
  - b2) form a reporting message including a reported time value based on the sheet processing and a reported type value based on the module's type value; and
  - b3) send the reporting message to the controller;

c) by the controller, for each module downstream of the feeder module:
  - c1) receive a reporting message from the module, the reporting message containing the module's reported time value and the module's reported type value;
  - c2) determine an order value for the module based on the module's reported time value, thus forming a determined order value; and
  - c3) determine a type value for the module based on the module's reported type value, thus forming a determined type value.

In a second aspect of the invention, there is described a media handling system comprising a configuration of N modules linked so that a first module is linked to a second module, the second module is linked to a third module, and so forth, and an (N−1)th module is linked to an Nth module, the direction from the first module to the Nth module defined as downstream, each module characterized by a type and an order, each module's type having a corresponding type value that is a member of a predetermined group of type values, each module's order having a corresponding order value that is based on the module's linkage in the configuration so that the first module has an order value of 1, the second module has an order value of 2, the third module has an order value of 3, and so forth, the (N−1)th module has an order value of (N−1) and the Nth module has an order value of N, at least one module having a type value of feeder, thus forming a feeder module, the media handling system including a controller and a communication means, the media handling system arranged to determine when the configuration is valid in accordance with a method, the method comprising:

a) by a feeder module, feed a sheet of media;

b) by each module downstream of the feeder module:
  - b1) process the sheet, thus forming a sheet processing;
  - b2) form a reporting message including a reported time value based on the sheet processing and a reported type value based on the module's type value; and
  - b3) send the reporting message to the controller;

c) by the controller, for each module downstream of the feeder module:
  - c1) receive a reporting message from the module, the reporting message containing the module's reported time value and the module's reported type value;
  - c2) determine an order value for the module based on the module's reported time value, thus forming a determined order value; and
  - c3) determine a type value for the module based on the module's reported type value, thus forming a determined type value.

DETAILED DESCRIPTION OF THE INVENTION

Briefly, a media handling system comprises a configuration of N linked modules. Each module has an order based on the module's linkage in the configuration. Thus, a first module of order 1 links to a second module of order 2, the second module links to a third module of order 3, etc., and an (N−1)th module of order (N−1) links to an Nth module of order N. A feeder module feeds a sheet of media to the downstream modules. Each downstream module sends a reporting message to an included controller. The reporting message includes the time the module processed the sheet and the module's reported type. For each reporting module, the controller determines the module's order and type based on the reported time and reported type in the module's reporting message. The controller validates the system configuration by determining when the order and the type for the reporting modules match a predetermined pattern.

When the controller determines that the order and type for any module downstream of the feeder module do not match the predetermined pattern, the controller determines that the configuration is not valid.

When the controller determines that the order and type for all modules downstream of the feeder module match the predetermined pattern, the controller determines that the configuration is valid.

Figure 1:
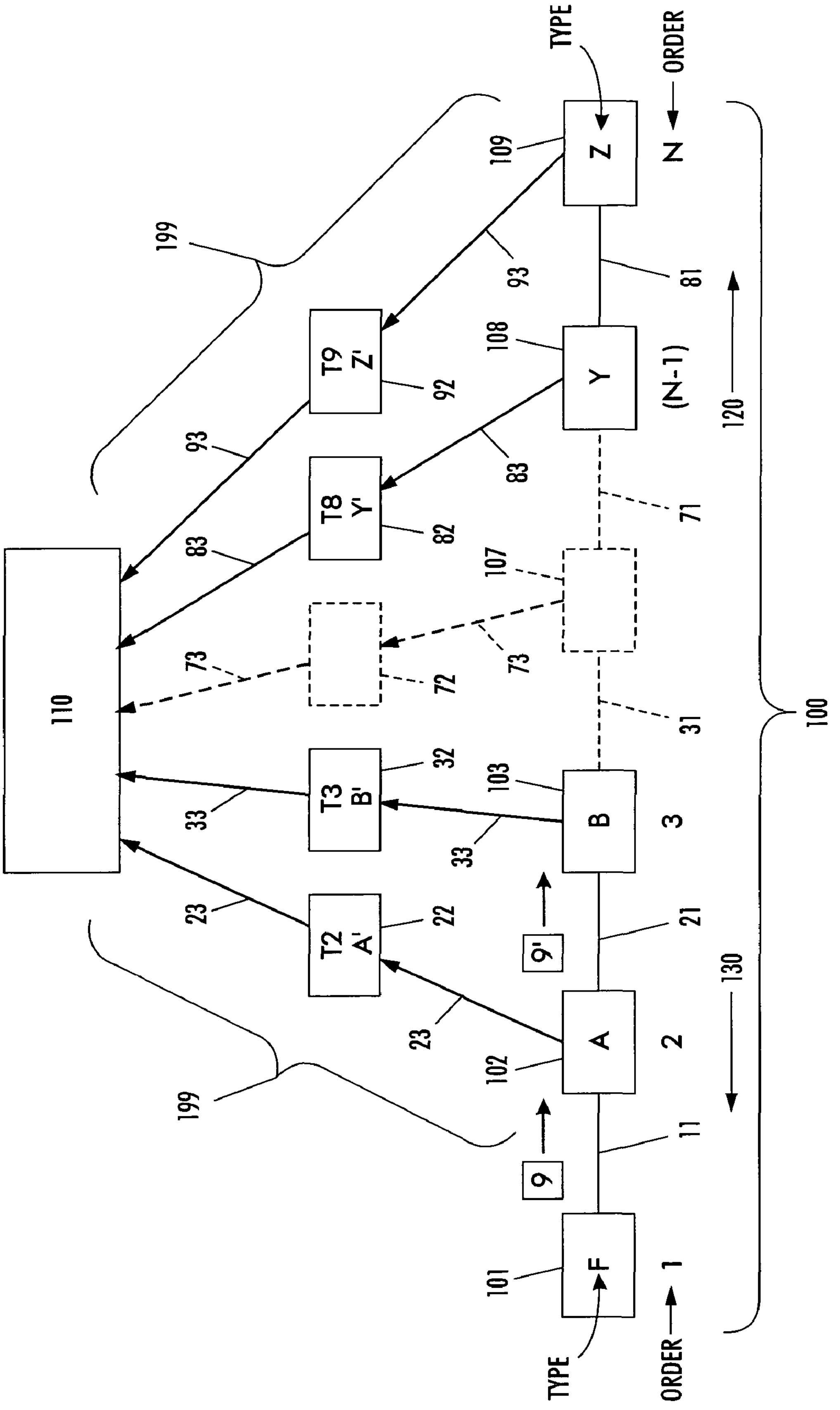
FIG. 1 depicts a media handling system comprising a configuration 100 of a N linked modules 101–109, the media handling system being arranged to determine when the configuration 100 is valid based on a method 200 in accordance with the present invention.

Referring now to FIG. 1 there is depicted a media handling system comprising a configuration 100 of N linked media handling modules 101–109. As shown, a first module 101 is linked by a link 11 to a second module 102, the second module is linked by a link 21 to a third module 103, and so forth, and an (N−1)th module 108 is linked by a link 81 to an Nth module 109.

In one embodiment, N equals 2.

In one embodiment, N equals 3.

In one embodiment, N equals 4.

In one embodiment, N equals 5.

In one embodiment, N equals any whole number greater than 5, such as 6, 7, 8, 9, 10, etc.

As shown, in one embodiment, the configuration 100 includes a possible intermediate module 107, shown in broken lines, with the intermediate module 107 linking to the third module 103 and to the (N−1)th module 108 by the respective links 31 and 71.

As shown in FIG. 1, the direction from the first module 101 to the Nth module 109 is defined as downstream, depicted by element 120. Conversely, the opposite direction, that is, the direction from the Nth module 109 to the first module 101 is defined as upstream, depicted by element 130.

As shown in FIG. 1, the media handling system includes a controller 110 and a communication means 199.

In one embodiment, the communication means 199 comprises an internet communication network.

In one embodiment, the communication means 199 comprises a wireless or radio frequency communication network.

In one embodiment, the communication means 199 comprises a local area communication network.

In the configuration 100, each module 101–109 is characterized by two parameters, namely, a type and an order.

In the configuration 100, each module's type has a corresponding type value that is a member of a predetermined group of type values. In FIG. 1, the type values for modules 101–109 are depicted as F, A, B, Y and Z. Thus, as shown, the first module 101 has a type value of F; the second module 102 has a type value of A; the third module 103 has a type value of B; the (N−1)th module 108 has a type value of Y; and the Nth module 109 has a type value of Z.

In the configuration 100, each module's order has a corresponding order value that is based on the module's linkage in the configuration 101. In FIG. 1, the order values for modules 101–109 are depicted as 1–N. Thus, as shown, the first module 101 has an order value of 1, the second module 102 has an order value of 2, the third module 103 has an order value of 3, and so forth, the (N−1)th module 108 has an order value of (N−1) and the Nth module 109 has an order value of N.

As shown in FIG. 1, configuration 100 comprises at least one feeder module 101, with a type value of feeder. In FIG. 1, the type value of feeder is depicted by the symbol "F". As shown, the feeder module 101 is the first module 101 of the configuration 100, with an order value of 1.

In one embodiment, the configuration 100 comprises only one feeder module 101.

In another embodiment, the configuration 100 comprises a plurality of feeder modules.

As shown in FIG. 1, the media handling system includes a controller 110. In accordance with the present invention, the media handling system is arranged to determine when the configuration 100 is valid in accordance with a method 200.

Figure 2:
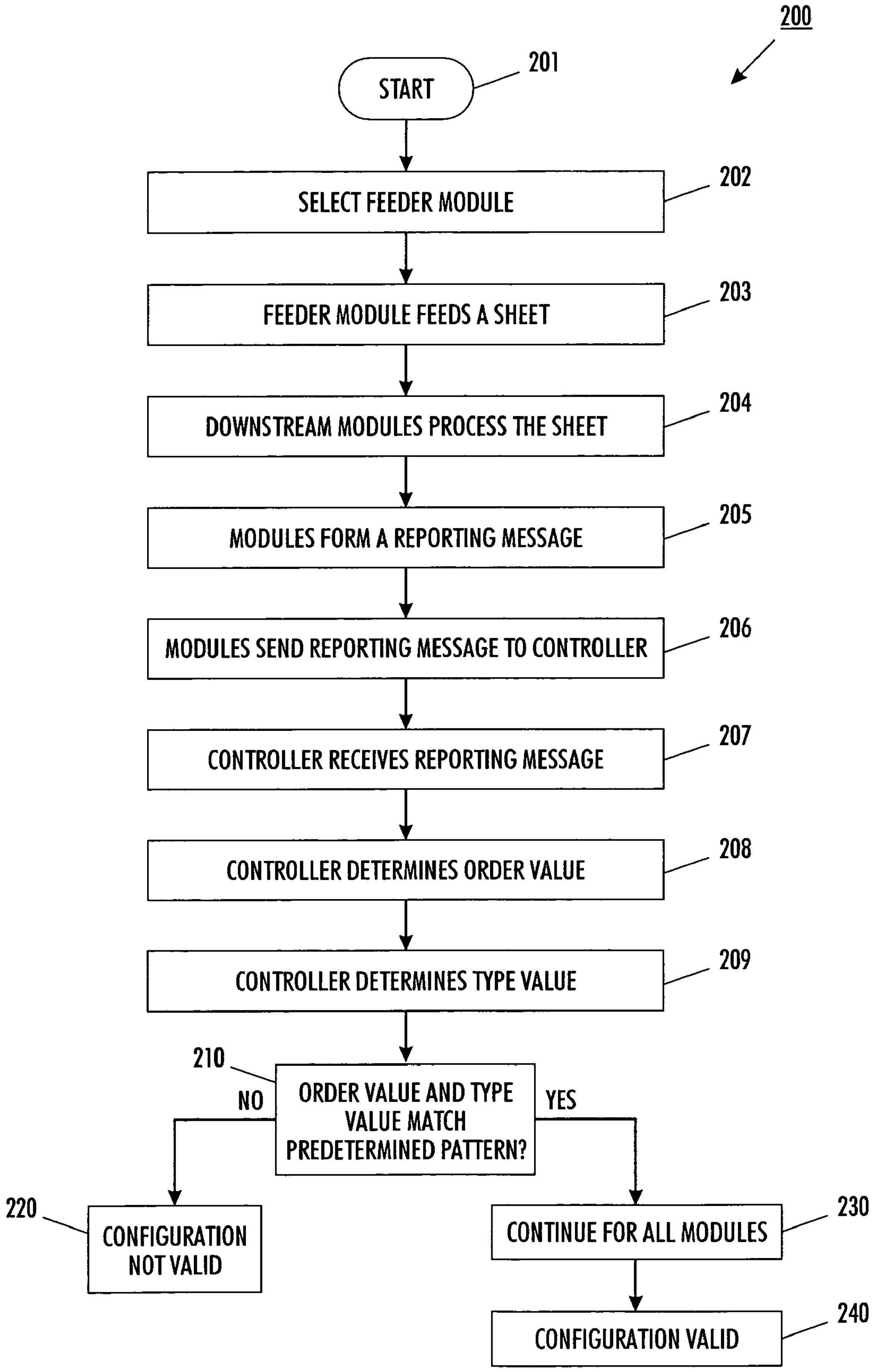
FIG. 2 depicts one embodiment of a flow diagram of the method 200.

Referring now to FIG. 2, there is depicted one embodiment of a flow diagram of the process or method 200.

The process starts, step 201, and then proceeds to step 202.

In step 202, when the configuration 101 includes a plurality of feeder modules, the process selects a feeder module from the plurality of feeder modules. In contrast, when the configuration 100 contains only one feeder module, namely, the feeder module 101, this step 202 is omitted. The process then goes to step 203.

In the discussion below, it is assumed that one of the following situations I–II apply:

I. The configuration 100 contains only a single feeder module, namely, the feeder module 101 and so the step 202 is omitted; or II. The configuration 100 contains multiple feeder modules including the feeder module 101 and the step 202 selects the feeder module 101.

In step 203, the feeder module 101 feeds a sheet 9 of media to the downstream module 102. The process then goes to step 204.

In step 204, each module 102–109 that is downstream of the feeder module 101 processes the sheet 9, thus forming a sheet processing.

Referring generally to steps 203 and 204, in the configuration 100 each media handling module 102–108 downstream of the feeder module 101 is arranged at least to receive the sheet 9 from its adjacent upstream module and thereafter to transmit the sheet 9 to its adjacent downstream module, and the last or Nth module 109 is arranged at least to receive the sheet 9 from its adjacent upstream module.

Hence, in step 203 the feeder module 101 feeds the sheet 9 to its adjacent downstream module 102.

In step 204, the following events occur: The module 102 receives sheet 9 from its adjacent upstream module 101 and transmits the sheet 9 (depicted as the element 9') to its adjacent downstream module 103; the module 103 receives sheet 9' from its adjacent upstream module 102 and transmits the sheet to its adjacent downstream module 107, and so forth; later the module 108 receives the sheet from its adjacent upstream module and transmits the sheet to its adjacent downstream module 109; ultimately the module 109 receives the sheet from its adjacent upstream module 108.

After step 204, the process goes to step 205.

In step 205, each module 102–109 that is downstream of the feeder module 101 forms a reporting message that includes first and second values, namely, a reported time value that is based on the module's processing of the sheet 9, or sheet processing, in step 205, and a reported type value that is based on the module's own type value.

Referring still to step 205, in one embodiment each module's reported time value is based on the module receiving the sheet 9 from its adjacent upstream module. For example, in this embodiment module 102's reported time value is based on the event of module 102 receiving sheet 9 from its adjacent upstream module 101.

Referring still to step 205, in one embodiment each module's reported time value is based on any of the modules receiving the sheet 9 from its adjacent upstream module and the module transmitting the sheet to its adjacent downstream module. For example, in this embodiment module 102's reported time value is based on the first event of module 102 receiving sheet 9 from its adjacent upstream module 101, or the second event of module 102 transmitting sheet 9 to its adjacent downstream module 103, or both the first event and second event.

Returning briefly to FIG. 1, the reporting message for the second module 102 is depicted as element 22. The reporting message 22 includes a reported time value T2 that is based on the second module 102's processing of the sheet 9. The reporting message 22 also includes a reported type value A' that is based on the second module 102's own type value of A.

Also in FIG. 1, the reporting message for the third module 103 is depicted as element 32. The reporting message 32 includes a reported time value T3 that is based on the third module 103's processing of the sheet 9. The reporting message 32 also includes a reported type value B' that is based on the third module 103's own type value of B.

Also in FIG. 1, the reporting message for the intermediate module 107 is depicted as element 72, shown in broken lines.

Also in FIG. 1, the reporting message for the (N−1)th module 108 is depicted as element 82. The reporting message 82 includes a reported time value T8 that is based on the (N−1)th module 108's processing of the sheet 9. The reporting message 82 also includes a reported type value Y' that is based on the (N−1)th module 108's own type value of Y.

Also in FIG. 1, the reporting message for the third module 109 is depicted as element 92. The reporting message 92 includes a reported time value T9 that is based on the third module 109's processing of the sheet 9. The reporting message 92 also includes a reported type value Z' that is based on the third module 109's own type value of Z.

Referring again to FIG. 2, after step 205 the process goes to step 206.

In step 206, each module 102–109 that is downstream of the feeder module 101 sends the module's own reporting message to the controller 110 by means of the communication network 199.

Returning briefly to FIG. 1, the second module 102's sending of its corresponding reporting message 22 to the controller 110 is depicted by the element 23.

Also in FIG. 1, the third module 103's sending of its corresponding reporting message 32 to the controller 110 is depicted by the element 33.

Also in FIG. 1, the intermediate module 107's sending of its corresponding reporting message 72 to the controller 110 is depicted by the element 73, shown in broken lines.

Also in FIG. 1, the (N−1)th module 108's sending of its corresponding reporting message 82 to the controller 110 is depicted by the element 83.

Also in FIG. 1, the Nth module 109's sending of its corresponding reporting message 92 to the controller 110 is depicted by the element 93.

Referring again to FIG. 2, after step 206 the process goes to step 207.

In step 207, the controller 110, for each module 102–109 downstream of the feeder module 101, receives the corresponding reporting message 22–92 from the module. As described above, each reporting message 22–92 contains the corresponding module 102–109's reported time value T2, T3, T8, T9 and reported type value A', B', Y', Z'. The process then goes to step 208.

In step 208, the controller 110, for each module 102–109 downstream of the feeder module 101, determines an order value for the module 102–109 based on the module's reported time value T2, T3, T8, T9, thus forming a determined order value 1–N. The process then goes to step 209.

In step 209, the controller 110, for each module 102–109 downstream of the feeder module 101, determines a type value for the module 102–109 based on the module's reported type value A', B', Y', Z', thus forming a determined type value A, B, Y, Z. The process then goes to step 210.

In step 210, the controller 110 determines when the determined order value formed in step 208 and the determined type value formed in step 209 for any module downstream of the feeder module 101 match a predetermined pattern of module order values and corresponding module type values.

Figure 3:
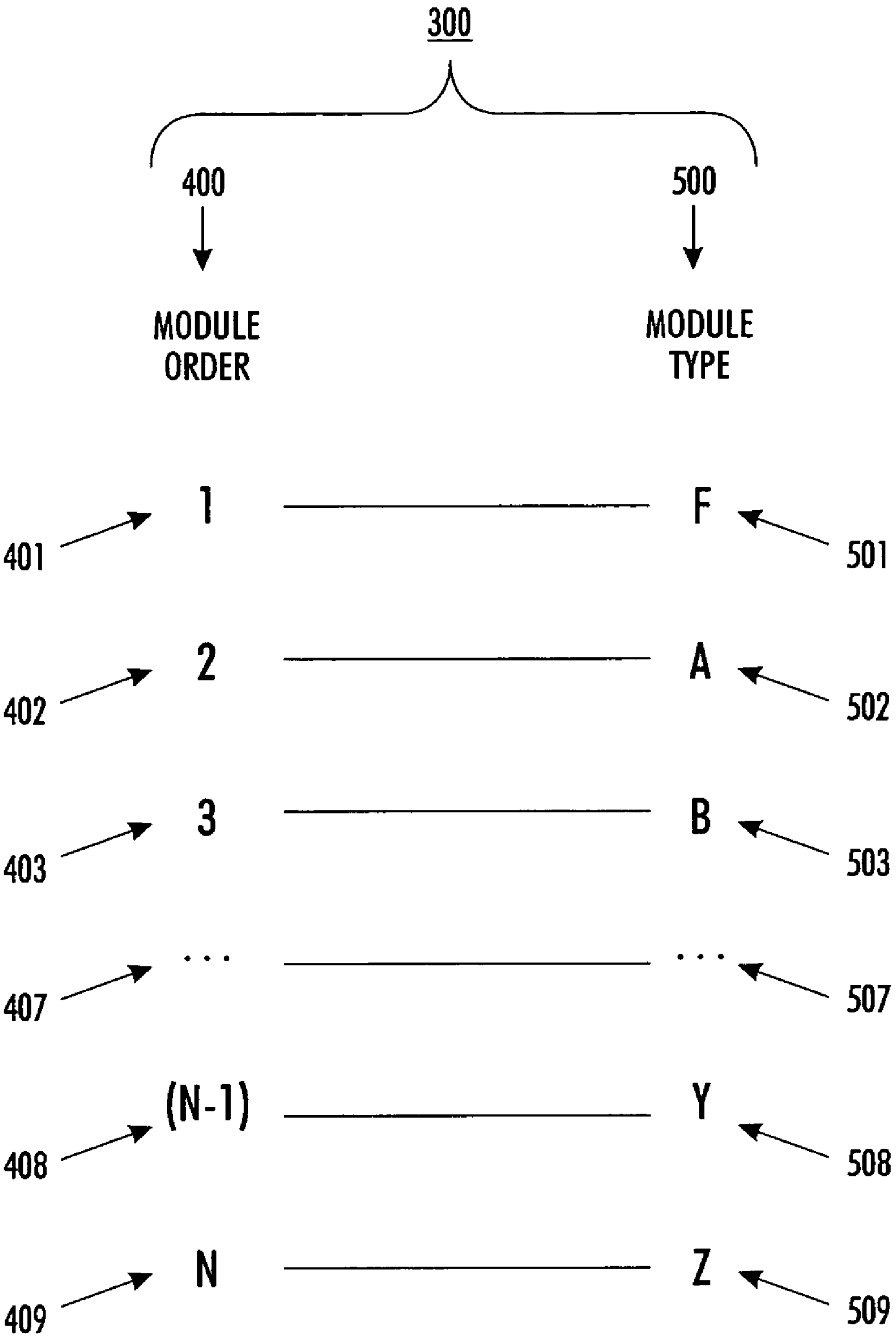
FIG. 3 depicts a typical example of a predetermined pattern 300 of module order values 400 and corresponding module type values 500. The pattern 300 is depicted for purposes of illustration only and not for purposes of limitation.

Referring now to FIG. 3, by way of example only and not by way of limitation, there is shown a typical illustrative example of a predetermined pattern 300 of module order values and corresponding module type values. As shown in FIG. 3, the pattern 300, which is intended for purposes of illustration only and not for purposes of limitation, comprises a first group 400 of elements 401–403 and 407–409 comprising respective module order values of 1, 2, 3, . . . , (N−1), N and a second group 500 of corresponding elements 501–503 and 507–509 comprising respective module type values of F, A, B, . . . , Y, Z.

Returning again to FIG. 2, in step 210 when the controller 110 determines that the determined order value formed in step 208 and the determined type value formed in step 209 for any of the modules 102–109 that are downstream of the feeder module 101 do not match the predetermined pattern, the process goes to step 220.

In step 220, the process determines that the configuration 100 is not valid.

Returning to step 210, when the controller 110 determines that the determined order value formed in step 208 and the determined type value formed in step 209 for any of the modules 102–109 that are downstream of the feeder module 101 match the predetermined pattern, the process goes to step 230.

In step 230, the determining step 210 continues or repeats for each and every successive module of the modules 102–109 that are downstream of the feeder module 101 and when the controller 110 determines that the determined order value formed in step 208 and the determined type value formed in step 209 for all the modules 102–109 that are downstream of the feeder module 101 match the predetermined pattern, the process goes to step 240.

In step 240, the process determines that the configuration 100 is valid.

Referring now generally to FIG. 1, in one embodiment the media handling system comprises a printing system.

Referring still to FIG. 1, in one embodiment the controller 110 comprises a scheduler.

Referring still to FIG. 1, in one embodiment the media comprises paper.

Referring now generally to FIG. 2, in one embodiment the method 200 comprises providing a feeder module as the first module 101.

Referring now generally to FIGS. 1–3, in one aspect, once the customer physically orders the printing system modules and manually enters the configuration, a sheet of paper is fed from the farthest feeder module through the system. Each module then reports the entry of the sheet into the module and the exit of the sheet from the module to the scheduler. The scheduler then uses this information to validate that the manually-entered configuration is correct. It can also use this information to determine the length of time that a module needs to process a sheet. One aspect of this method is that you can determine if a module is not responding. This can be done by checking the difference in time that a sheet exited one module and entered another module. If the difference exceeds a maximum time (time to transition a gap), then you would know that one or more modules did not respond. If the difference is less than or equal to the maximum, then you would know that the modules are sequential.

In summary, there has been described a media handling system as depicted in FIG. 1 comprising a configuration 100 of N linked modules 101–109. Each module has an order 1-N based on the module's linkage 11, 21, 31, . . . , 71, 81 in the configuration. Thus, a first module 101 of order 1 links 11 to a second module 102 of order 2, the second module links 21 to a third module 103 of order 3, etc., and an (N−1)th module 108 of order (N−1) links 81 to an Nth module 109 of order N. A feeder module 101 feeds a sheet of media 9 to the downstream modules 102–109. Each downstream module 102–109 sends a reporting message 22–92 to the controller 110. The reporting message 22–92 includes the time T2–T9 the module 102–109 processed the sheet 9 and the module's reported type A', B', Y', Z'. For each reporting module 102–109, the controller 110 determines the module's order 2–N and type A, B, Y, Z based on the reported time T2–T9 and reported type A', B', Y', Z' in the module's reporting message 22–92. The controller 110 validates the configuration by determining in step 210 when the determined order and the determined type for the reporting modules 102–109 match a predetermined pattern. When the controller 110 determines in step 210 that the determined order and determined type for any module downstream of the feeder module 101 do not match the predetermined pattern, the controller determines in step 220 that the configuration is not valid. When the controller 110 determines in the steps 210 and 230 that the order and type for each module 102–109 downstream of the feeder module 101 match the predetermined pattern, the controller determines in step 240 that the configuration is valid.

Thus, there has been described the first aspect of the invention, namely, a method 200 as depicted in FIG. 2 to determine when a media handling system configuration 100 as depicted in FIG. 1 is valid, the configuration 100 comprising N modules 101–109 linked so that a first module 101 is linked to a second module 102, the second module is linked to a third module 103, and so forth, and an (N−1)th module 108 is linked to an Nth module 109, the direction from the first module to the Nth module defined as downstream 120, each module characterized by a type and an order, each module's type having a corresponding type value that is a member of a predetermined group of type values F, A, B, Y, Z, each module's order having a corresponding order value that is based on the module's linkage in the configuration so that the first module 101 has an order value of 1, the second module 102 has an order value of 2, the third module 103 has an order value of 3, and so forth, the (N−1)th module 108 has an order value of (N−1) and the Nth module 109 has an order value of N, at least one module 101 having a type value of feeder (F), thus forming a feeder module 101, the media handling system including a controller 110 and a communication means 199, the method 200 comprising:

a) by a feeder module 101, feed (in step 203) a sheet of media 9;

b) by each module 102–109 downstream of the feeder module 101:

b1) process (in step 204) the sheet, thus forming a sheet processing;

b2) form (in step 205) a reporting message 22, 32, 82, 92 including a reported time value T2, T3, T8, T9 based on the sheet processing and a reported type value A', B', Y', Z' based on the module's type value A, B, Y, Z; and b3) send (in step 206) the reporting message to the controller;

c) by the controller 110, for each module 102–109 downstream of the feeder module 101:

c1) receive (in step 207) a reporting message 22, 32, 82, 92 from the module, the reporting message containing the module's reported time value T2, T3, T8, T9 and the module's reported type value A', B', Y', Z';

c2) determine (in step 208) an order value for the module based on the module's reported time value, thus forming a determined order value; and c3) determine (in step 209) a type value for the module based on the module's reported type value, thus forming a determined type value.

Also in the first aspect, the controller 110 determines in step 210 when the determined order value and the determined type value for any module downstream of the feeder module 101 match a predetermined pattern.

Also in the first aspect, the controller 110 determines in step 210 when the determined order value and the determined type value match a predetermined pattern, and based on the controller 110 determining in step 210 that the determined order value and the determined type value for any module downstream of the feeder module 101 do not match the predetermined pattern, the controller 110 determines in step 220 that the configuration is not valid.

Also in the first aspect, the controller 110 determines in step 210 when the determined order value and the determined type value match a predetermined pattern, and based on the controller 110 determining in step 210 and in step 230 that the determined order value and the determined type value for all modules 102–109 downstream of the feeder module 101 match the predetermined pattern, the controller 110 determines in step 240 that the configuration is valid.

Also, there has been described the second aspect of the invention, namely, a media handling system as depicted in FIG. 1 comprising a configuration 100 of N modules 101–109 linked so that a first module 101 is linked to a second module 102, the second module is linked to a third module 103, and so forth, and an (N−1)th module 108 is linked to an Nth module 109, the direction from the first module to the Nth module defined as downstream 120, each module characterized by a type and an order, each module's type having a corresponding type value that is a member of a predetermined group of type values F, A, B, Y, Z, each module's order having a corresponding order value that is based on the module's linkage in the configuration so that the first module 101 has an order value of 1, the second module 102 has an order value of 2, the third module 103 has an order value of 3, and so forth, the (N−1)th module 108 has an order value of (N−1) and the Nth module 109 has an order value of N, at least one module 101 having a type value of feeder (F), thus forming a feeder module 101, the media handling system including a controller 110 and a communication means 199, the media handling system arranged to determine when the configuration is valid in accordance with a method 200 as depicted in FIG. 2, the method 200 comprising:

a) by a feeder module 101, feed (in step 203) a sheet of media 9;

b) by each module 102–109 downstream of the feeder module 101:

b1) process (in step 204) the sheet, thus forming a sheet processing;

b2) form (in step 205) a reporting message 22, 32, 82, 92 including a reported time value T2, T3, T8, T9 based on the sheet processing and a reported type value A', B', Y', Z' based on the module's type value A, B, Y, Z; and b3) send (in step 206) the reporting message to the controller;

c) by the controller 110, for each module 102–109 downstream of the feeder module 101:

c1) receive (in step 207) a reporting message 22, 32, 82, 92 from the module, the reporting message containing the module's reported time value T2, T3, T8, T9 and the module's reported type value A', B', Y', Z';

c2) determine (in step 208) an order value for the module based on the module's reported time value, thus forming a determined order value; and c3) determine (in step 209) a type value for the module based on the module's reported type value, thus forming a determined type value.

Also in the second aspect, the controller 110 determines in step 210 when the determined order value and the determined type value for any module downstream of the feeder module 101 match a predetermined pattern.

Also in the second aspect, the controller 110 determines in step 210 when the determined order value and the determined type value match a predetermined pattern, and based on the controller 110 determining in step 210 that the determined order value and the determined type value for any module downstream of the feeder module 101 do not match the predetermined pattern, the controller 110 determines in step 220 that the configuration is not valid.

Also in the second aspect, the controller 110 determines in step 210 when the determined order value and the determined type value match a predetermined pattern, and based on the controller 110 determining in step 210 and in step 230 that the determined order value and the determined type value for all modules 102–109 downstream of the feeder module 101 match the predetermined pattern, the controller 110 determines in step 240 that the configuration is valid.

While various embodiment of a method to determine when a media handling system configuration is valid and a media handling system arranged in accordance with the same method, in accordance with the present invention, have been described hereinabove, the scope of the invention is defined by the following claims.

What is claimed is:

1. A method to determine when a media handling system configuration is valid, the configuration comprising N modules linked so that a first module is linked to a second module, the second module is linked to a third module, and so forth, and an (N−1)th module is linked to an Nth module, the direction from the first module to the Nth module defined as downstream, each module characterized by a type and an order, each module's type having a corresponding type value that is a member of a predetermined group of type values, each module's order having a corresponding order value that is based on the module's linkage in the configuration so that the first module has an order value of 1, the second module has an order value of 2, the third module has an order value of 3, and so forth, the (N−1)th module has an order value of (N−1) and the Nth module has an order value of N, at least one module having a type value of feeder, thus forming a feeder module, the media handling system including a controller and a communication means, the method comprising:

a) by a feeder module, feed a sheet of media;

b) by each module downstream of the feeder module:

b1) process the sheet, thus forming a sheet processing;

b2) form a reporting message including a reported time value based on the sheet processing and a reported type value based on the module's type value; and b3) send the reporting message to the controller;

c) by the controller, for each module downstream of the feeder module:

c1) receive a reporting message from the module, the reporting message containing the module's reported time value and the module's reported type value;

c2) determine an order value for the module based on the module's reported time value, thus forming a determined order value; and c3) determine a type value for the module based on the module's reported type value, thus forming a determined type value.

2. The method of claim 1 including, by the controller, determining when the determined order value and the determined type value for at least one module downstream of the feeder module match a predetermined pattern.

3. The method of claim 1 including, by the controller, determining when the determined order value and the determined type value match a predetermined pattern, and based on determining that the determined order value and the determined type value for any module downstream of the feeder module do not match the predetermined pattern, determining that the configuration is not valid.

4. The method of claim 1 including, by the controller, determining when the determined order value and the determined type value match a predetermined pattern, and based on determining that the determined order value and the determined type value for all modules downstream of the feeder module match the predetermined pattern, determining that the configuration is valid.

5. The method of claim 1, the communication means comprising an internet communication network.

6. The method of claim 1, the communication means comprising a wireless or radio frequency communication network.

7. The method of claim 1, the communication means comprising a local area communication network.

8. The method of claim 1 including providing a feeder module as the first module.

9. The method of claim 1, the configuration having a plurality of feeder modules, including selecting a feeder module from the plurality of feeder modules.

10. The method of claim 1, the direction from the Nth module to the first module defined as upstream, each module's reported time value based on the module receiving the sheet from the adjacent upstream module.

11. The method of claim 1, the direction from the Nth module to the first module defined as upstream, each module's reported time value based on any of the module receiving the sheet from the adjacent upstream module and the module transmitting the sheet to the adjacent downstream module.

12. The method of claim 1 wherein the media handling system comprises a printing system.

13. The method of claim 12 wherein the controller comprises a scheduler.

14. The method of claim 1 wherein the media comprises paper.

* * * * *